2,694,926

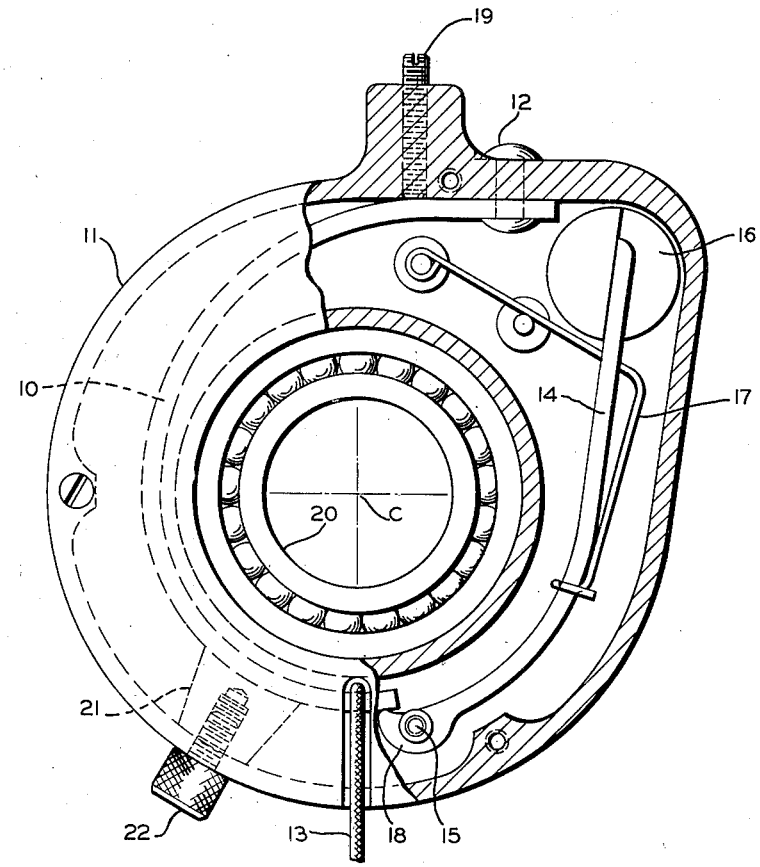
Nov. 23, 1954 — C. K. HANSEN ET AL — 2,694,926
CORD TENSION INDICATOR
Filed Feb. 5, 1946
CARL K. HANSEN
PHILIP H. MILLER
LEOPOLD E. ROVNER
*INVENTORS.*
BY
ATTORNEY 2,694,926
Patented Nov. 23, 1954

CORD TENSION INDICATOR

Carl K. Hansen, Arlington, Mass., Philip H. Miller, Tuxedo Park, N. Y., and Leopold E. Rovner, Iowa City, Iowa, assignors, by mesne assignments, to the United States of America as represented by the Secretary of the Navy Application February 5, 1946, Serial No. 645,623

9 Claims. (Cl. 73—143)

This invention relates to geometrical curve-producing instruments and more particularly to tension-indicating gauges for such instruments.

In drawing a hyperbola with a cord hyperbolograph instrument such as is disclosed in the copending application of Leopold E. Rovner for a Hyperbolograph Instrument, Serial Number 639,897, filed January 8, 1946, the stylus unit is placed at the start of the curve and then pulled toward the base line by the resultant action of two cords issuing as from the foci. The correct position of the stylus unit for starting the curve occurs when the tension in the two cords is the same. To avoid errors in this initial setting, an accurate means of determining the equality of the tensions in the two cords is required. Mechanical gauges may be used to accomplish this and should be located at the stylus unit for convenience of the stylus unit operator. After the stylus unit has been properly set at the start of a curve, the tension gauges provided for this purpose must not interfere with the proper functioning of the hyperbolograph instrument during the drawing of the curve. This requires that the cords issue effectively as from the point of the stylus and that the distance from this stylus point to the point of connection of the cord to the gauge remain contant during the drawing of the curve.

The principal object of this invention is to provide gauges for the indication of the tension of the cords of a hyperbolograph instrument.

Another object of this invention is to provide tension gauges for correctly setting the stylus unit of a hyperbolograph instrument at the start of a curve.

A further object of this invention is to provide tension gauges for hyperbolograph instruments which will not interfere with the proper functioning of the instrument during the drawing of the curve.

Other and further objects will appear during the course of the following description when taken with the accompanying drawing which is a partially cut-away view of one embodiment of this invention.

In the drawing a mainspring 10 is located within a metallic housing 11 and fastened thereto at one of its ends by rivet 12 or other suitable means. Cord 13 is attached through a slot in housing 11 to mainspring 10 at a point near its free end so that tension on cord 13 reduces the curvature of mainspring 10. The motion of the free end of mainspring 10 is mechanically amplified by a lever of the first class formed by indicating arm 14 and its pivot point 15. Thus the amount of tension on cord 13 is indicated by the deflection of arm 14 on circular dial face 16 which has a reference line inscribed thereon. A second spring 17 is provided to maintain contact between anvil 18 of arm 14 and the free end of mainspring 10. The wall of housing 11 is drilled and threaded to receive setscrew 19 which bears against mainspring 10 near its secured end. Housing 11 is adapted to receive a ball bearing 20 concentric with an axis at C which is perpendicular to the plane containing mainspring 10 and arm 14 and which passes through the center of gravity of the gauge. A block 21 is fastened to mainspring 10 near its free end by a suitable means and is located between mainspring 10 and the wall of housing 11. Block 21 is drilled and threaded to receive thumbscrew 22, which extends through a hole in the wall of housing 11, the knurled portion of the screw being outside housing 11.

The tension gauge of the embodiment shown in the drawing is adapted to be mounted on a hyperbolograph stylus unit such as is disclosed in the copending application of Philip H. Miller and Leopold E. Rovner for a Tension-Equilibrium-Seeking Stylus Mechanism, Serial Number 652,198, filed March 5, 1946. Ball bearing 20 fits over a post on the stylus unit so that it is concentric with an axis passing through the point of the stylus, this stylus axis coinciding with the axis at C which passes through the center of gravity of the gauge. Thus the gauge can rotate freely about this stylus axis and cord 13 effectively issues radially as from this stylus axis or from the stylus point. Since the center of gravity of the gauge coincides with the stylus axis, the gauge has a minimum moment of inertia about the stylus axis and thus oscillations are minimized under elastic tension in cord 13 as the stylus unit is being drawn along its desired path.

When setting the stylus unit at the start of a curve, two gauges of the type described may be used, one attached to each cord, and the position of the stylus unit is adjusted until the straight edge of indicating arm 14 on both gauges coincides with the reference mark on dial face 16. When setscrew 19 has been properly adjusted, this position of the stylus unit produces an equal tension in both cords which corresponds to the cord tensions during the drawing of the curve when the instrument is used under the prescribed condition. This adjustment of setscrew 19 is made so that a sixteen ounce pull on cord 13 will produce the reference deflection with thumbscrew 22 loosened so that mainspring 10 is not held against the wall of housing 11.

Having properly set the stylus unit at the start of a curve, thumbscrew 22 is then tightened. This clamps block 21 against the wall of housing 11 and locks the mainspring in the position corresponding to a sixteen ounce pull on cord 13. Then the stylus unit is pulled toward the base line by the two cords. The index lock formed by thumbscrew 22 and block 21 insures a constant distance from stylus axis to cord origin and also prevents vibration which would otherwise result from the elastic coupling of cord 13 to the gauge through mainspring 10.

This invention is only to be limited by the appended claims.

What is claimed is:

1. In a cord hyperbolograph instrument having a stylus unit which is pulled along a horizontal surface by the resultant action of two cords, a mechanical tension gauge comprising, a housing containing a mainspring and a lever of the first class coupled at one end to said mainspring for indicating the position of said mainspring, a cord connected to said mainspring and passing through a slot in said housing, an index lock for clamping said mainspring in a fixed position, and means for mounting said housing on said stylus unit such that said cord issues radially as from an axis passing through the point of said stylus unit and the center of gravity of said gauge, whereby the tension in said cord can be measured during the setting of said stylus unit at the start of a curve, and then, with the mainspring clamped, said curve can be drawn without interference from said gauge.

2. In a cord hyperbolograph instrument having a stylus unit which is pulled along a horizontal surface by the resultant action of two cords, a mechanical tension gauge comprising, a metallic housing containing a mainspring and a lever of the first class coupled at one end to one end of said mainspring for indicating the position of said mainspring, a ball bearing, said ball bearing being mounted in said housing concentric with an axis passing through the center of gravity of said gauge and perpendicular to a plane containing said mainspring and said lever, said ball bearing being adapted to fit over a post on said stylus unit such that said axis of said gauge coincides with the stylus axis of said stylus unit, a cord connected to said mainspring and passing through a slot in said housing, and an index lock for clamping said mainspring in a fixed position, whereby the tension in said cord can be measured during the setting of said stylus unit at the start of a curve and then, with said mainspring clamped, said stylus unit can be pulled along under the tension of said cord through an inelastic radial connection, thus preventing vibration and changes in the effective length from said stylus axis to the point of connection of said cord to said gauge, and minimizing oscillations which would result from a large moment of inertia about said stylus axis.

3. A mechanical tension gauge for measuring the tension in a cord issuing radially from an attaching post, said gauge comprising, a housing containing a mainspring and a lever of the first class coupled at one end to one end of said mainspring for indicating the position of said mainspring, a ball bearing, said ball bearing being mounted in said housing concentric with an axis passing through the center of gravity of said gauge and perpendicular to a plane containing said mainspring and said lever, said ball bearing being adapted to fit over said attaching post, a cord connected to said mainspring and passing through an opening in said housing, and an index lock for clamping said mainspring in a fixed position whereby, with said mainspring clamped, said cord is secured to said attaching post through an inelastic radial connection.

4. A mechanical tension gauge for measuring the tension in a cord issuing radially from an attaching post, said gauge comprising a housing, means for rotatably mounting said housing on said attaching post, a mainspring secured at one end to said housing, a lever of the first class rotatably mounted about an axis parallel to the rotational axis of said housing, the unattached end of said mainspring being disposed in contact with one arm of said lever, a cord connected to said mainspring adjacent said unattached end and passing through an opening in said housing, whereby the position of said lever is indicative of the tension in said cord, and an index lock for clamping said mainspring in a fixed position whereby, with said mainspring clamped, said cord is secured to said attaching post through an inelastic radial connection.

5. A mechanical tension gauge for measuring the tension in a cord issuing radially from an attaching post, said gauge comprising a housing, means for rotatably mounting said housing on said attaching post, a curved mainspring disposed in a plane perpendicular to the axis of rotation of said housing, said mainspring being secured at one end to said housing, a lever of the first class rotatably mounted about an axis parallel to the rotational axis of said housing, the unattached end of said mainspring being disposed in contact with one arm of said lever, a cord connected to said mainspring adjacent said unattached end and passing through an opening in said housing, and an index lock for clamping said mainspring in a fixed position, whereby, with said mainspring clamped, said cord is secured to said attaching post through an inelastic radial connection.

6. A mechanical tension gauge for measuring the tension in a cord issuing radially from an attaching post, said gauge comprising a housing, means for rotatably mounting said housing on said attaching post, a curved mainspring and a lever of the first class disposed within said housing in a plane perpendicular to the axis of rotation of said housing, a first end of said mainspring being secured to said housing and a second end of said mainspring being disposed in contact with a first arm of said lever, a second spring member maintaining said first arm of said lever in contact with said mainspring, an index disposed adjacent the second arm of said lever, and a cord connected to said second end of said mainspring and passing through an opening in said housing.

7. A mechanical tension gauge for measuring the tension in a cord issuing radially from an attaching post, said gauge comprising a housing, means for rotatably mounting said housing on said attaching post, a mainspring and a lever of the first class disposed within said housing in a plane perpendicular to the axis of rotation of said housing, a first end of said mainspring being secured to said housing and a second end of said mainspring being disposed in contact with a first arm of said lever, said lever and said mainspring being curved to lie adjacent to said means for mounting said housing on said attaching post, a second spring member maintaining said first arm of said lever in contact with said mainspring, an index disposed adjacent the second arm of said lever, and a cord connected to said second end of said mainspring and passing through an opening in said housing, the position of said second arm of said lever relative to said index being indicative of the tension in said cord.

8. A tension gauge as in claim 7, said tension gauge further comprising an index lock for clamping said mainspring in a fixed position whereby, with said mainspring clamped, said cord is secured to said attaching post through an inelastic radial connection.

9. A tension gauge as in claim 7, said tension gauge further comprising means for adjusting the curvature of said mainspring to cause said second end of said lever to occupy a position opposite said index when said cord is subjected to a predetermined tension and an index lock for clamping said mainspring in a fixed position whereby, with said mainspring clamped, said cord is secured to said attaching post through an inelastic radial connection.

References Cited in the file of this patent

UNITED STATES PATENTS

| Number | Name | Date |
|---|---|---|
| 290,840 | Blakeslee | Dec. 25, 1883 |
| 1,001,666 | McGuire | Aug. 29, 1911 |
| 1,289,066 | Adams | Dec. 31, 1918 |
| 1,715,098 | Riley | May 28, 1929 |
| 1,724,993 | Coker | Aug. 20, 1929 |
| 2,133,763 | Williams | Oct. 18, 1938 |